United States Patent [19]
O'Donnell

[11] Patent Number: 6,141,853
[45] Date of Patent: Nov. 7, 2000

[54] METHOD OF MANUFACTURING AND ENERGY ABSORPTION APPARATUS FOR A RAILROAD CAR

[75] Inventor: William P. O'Donnell, Plainfield, Ill.

[73] Assignee: Miner Enterprises, Inc., Del.

[21] Appl. No.: 09/204,484

[22] Filed: Dec. 3, 1998

[51] Int. Cl.$^7$ .................................................. B23P 11/02
[52] U.S. Cl. ......................... 29/446; 29/896.93; 264/294
[58] Field of Search ........................... 29/896.93, 896.09, 29/446, 898.09; 264/294, 320

[56] References Cited

U.S. PATENT DOCUMENTS

| | | | |
|---|---|---|---|
| 3,696,891 | 10/1972 | Poe | 188/1 |
| 4,023,438 | 5/1977 | Birkle | 74/574 |
| 4,712,487 | 12/1987 | Carlson | 105/199.3 |
| 4,793,720 | 12/1988 | Merker, Jr. | 384/423 |
| 4,859,089 | 8/1989 | Wright | 384/423 |
| 4,924,779 | 5/1990 | Curtis et al. | 105/4.1 |
| 4,998,997 | 3/1991 | Carlson | 267/3 |
| 5,086,707 | 2/1992 | Spencer et al. | 105/199.3 |
| 5,335,403 | 8/1994 | Jensen | 29/173 |
| 5,868,384 | 2/1999 | Anderson . | |

FOREIGN PATENT DOCUMENTS

0419057 A1  12/1990  European Pat. Off. .

*Primary Examiner*—S. Thomas Hughes
*Assistant Examiner*—Anthony L. Green
*Attorney, Agent, or Firm*—John W. Harbst

[57] ABSTRACT

The present invention discloses a method for manufacturing an elastomeric spring adapted for use in combination with a railroad car energy absorption apparatus. The method of the present invention involves the step of stabilizing the elastomeric spring prior to insertion of the energy absorption apparatus on the railroad car. Stabilization of the elastomeric spring is effected by submitting the elastomeric member to a predetermined repetitive compression pattern comprised of a series of individual compression cycles. Cyclically compressing the elastomeric member in the predetermined repeat pattern prior to installation of the energy absorption apparatus on the railroad car effects permanent deformation of the elastomeric member while maintaining the preload force developed for the energy absorption apparatus to remain at a substantially constant maximized level simulating a predetermined wear condition for the energy absorption apparatus.

14 Claims, 2 Drawing Sheets

METHOD OF MANUFACTURING AND ENERGY ABSORPTION APPARATUS FOR A RAILROAD CAR

FIELD OF THE INVENTION

The present invention generally relates to railroad cars and, more particularly, to a method of manufacturing an energy absorption apparatus for a railroad car.

BACKGROUND OF THE INVENTION

Impact forces of significant magnitude are commonly imparted to railroad cars during their use. For example, draft gears are provided toward opposite ends of each railroad car to absorb axially directed impact forces applied to the railroad car when the cars are operably coupled to each other and during transportation of the railroad car between locations. Side bearings are also commonly used on railroad cars to control or impede "hunting" movements of wheeled trucks on the railroad car and to control rolling movements of the railroad car body about a generally horizontal axis. Typically, a side bearing is disposed on opposite lateral sides of a longitudinal axis of the car between a bolster of a wheeled truck and the body of the railroad car. While the present invention is disclosed and described for use with a railroad car side bearing, it should be appreciated that the principals and application of the present invention extend beyond railroad car side bearings to additional or other forms of energy absorption assemblies for railroad cars.

Hunting is a phenomenon created by the wheeled trucks during movement of the railroad car over tracks. The coned wheels of each truck travel a sinuous path along a tangent or straight track as they continually seek a centered position under the steering influence of wheel conicity. In traveling such a sinuous path, a truck will yaw cyclically with respect to the car body about a vertical axis defined by the vertical centerline of the truck bolster. Of course, the truck also yaws or rotates quasi-statically with respect to the car body in negotiating curved track. As a result of the afore-mentioned cyclic yawing; "hunting" can occur as the yawing becomes unstable due to lateral resonance that can develop between the car body and the truck. As will be appreciated by those skilled in the art, excessive "hunting" can result in premature wear of the wheeled truck components including the wheels, bolsters, and related equipment. Hunting can furthermore cause damage to the lading being transported in the car body of the railroad car.

Typically, a side bearing includes a base housing or cage which mounts to the bolster of the wheeled truck, a top plate, and a spring disposed between the top plate and base. In one form, the top plate and base are arranged in telescopic relation relative to each other. The spring of each side bearing places a predetermined preload on the top plate. When assembled on the railroad car, this vertical force or preload developed by the spring acts essentially to keep the top plate of the side bearing in constant contact with the underside of the body of the railroad car to impede yaw axis motion of the truck. Thus, these types of side bearings are sometimes referred to as "constant contact" side bearings. For purposes of this description, however, the term "side bearing" will be used throughout. As the truck yaws, the top plate of the side bearing slides across an underside of the car body. The resulting friction forces produce an opposite torque which acts to inhibit yaw motion. The preload or vertically directed force placed on the top plate of each side bearing by the spring furthermore serves to limit the roll motion of the car body.

Especially in connection with railroad car side bearings, it should be noted that while a sufficient preload or vertically directed force needs to be maintained against the underside of the truck body to impede truck hunting, there is a limit to the maximum vertically directed force or preload which can be effectively applied against the underside of the truck body. According to AAR Specifications for Design and Fabrication of Freight Cars, and in order for the wheeled truck to turn, thus allowing the railroad car to negotiate curves, the preload developed by the side bearing spring is limited to 85% of the weight of the railroad car body. Furthermore, during assembly of a new railroad car or when existing railroad cars are retrofitted with new side bearings, the vertically directed force developed by the spring of the side bearing must allow a centerplate on the body of the railroad car to operably engage the truck bolster after a relatively short time period, i.e., 24 hours, thereby enabling the railroad car to be released for service.

Recently, different forms of elastomeric materials have been used as the spring for such railroad car side bearings. One such spring is marketed and sold by the Assignee of the present invention under the tradename TecsPak. This form of resilient spring is formed from a HYTREL elastomer, manufactured and sold by the DuPont Company. Ordinarily, a HYTREL elastomer has inherent physical properties that make it unsuitable for use as a spring. Applicant's assignee, however, has advantageously discovered methods by which the copolyesther polymer elastomer sold under the name HYTREL can be converted into a compression spring material. Generally, this method involves the application of a one-time compressive force to a body of HYTREL material so as to compress the body in an axial direction to an extent greater than 30% of its initial axial length.

Heretofore, after an elastomeric spring is formed, it is assembled into the side bearing and, ultimately, used in service on the railroad car. Research reveals, however, side bearings using elastomeric springs experience a significant reduction in the preload force applied by the spring after only a limited time in service. Of course, a reduction in the preload or force developed by the spring correspondingly effects the engagement force between the top plate of the side bearing and the underside of the railroad car body thereby limiting the ability of the side bearing to impede the yaw axis rotation or hunting of the wheeled truck as the car moves along the track which can result in premature wear of the truck components including the wheels, bolster and related parts and equipment. Applicants research has further revealed that after this limited time of in-service use of the side bearing has expired, any further reduction in the preload developed by the side bearing against the underside of the railroad car body takes place at a considerably slower rate.

Thus, there is a need and a desire for a process for manufacturing an energy absorption apparatus for a railroad car which utilizes an elastomeric spring and wherein a substantially constant preload or force is maintained by the energy absorption apparatus during and continuing after initial use of the energy absorption apparatus on the railroad car.

SUMMARY OF THE INVENTION

In view of the above, and in accordance with the present invention, there is provided a process or method of manufacturing an energy absorption apparatus for a railroad car. The energy absorption apparatus of the present invention offers enhanced performance characteristics by minimizing the initial reduction in preload force developed for the energy absorption apparatus. Broadly stated, the method or process of the present invention comprises the steps of: providing an elastomeric spring member having an initial shape including an initial height between opposed ends thereof; and stabilizing the elastomeric spring member prior to its insertion between first and second members of the energy absorption apparatus. Stabilization of the elastomeric spring through a manufacturing process and prior to insertion of the energy absorption apparatus into operable combination with the railroad car maximizes and maintains a substantially constant elastomeric spring preload while simulating a predetermined wear condition for the energy absorption apparatus.

A salient feature of the present invention relates to the specific process or method for stabilizing the elastomeric spring prior to the energy absorption apparatus being arranged in operative combination with the railroad car. In a preferred form of the invention, stabilizing the elastomeric spring involves cyclically compressing the elastomeric spring in a predetermined repeat pattern prior to insertion of the spring into operative combination with the energy absorption apparatus. Applicants testing and analysis has surprisingly revealed the repeated cyclical compression of the elastomeric member forming the spring effects permanent deformation of the elastomeric member while simultaneously reducing the initial preload to an acceptable level, thus, simulating a predetermined wear condition for the energy absorption apparatus and thereby minimizing the reduction in preload force developed by the energy absorption apparatus when initially installed on the railroad car.

According to a preferred process or method of forming or manufacturing the elastomeric spring, each individual compression cycle for the elastomeric member of the energy absorption apparatus includes the steps of: compressing the elastomeric member to a predetermined height; holding the compressed elastomeric member at the compressed height for a predetermined time period; and releasing the compressed elastomeric member. When the elastomeric spring member is formed from a HYTREL material, each individual compression cycle for the elastomeric spring comprises the steps of: compressing the elastomeric spring member beyond the plastic limit thereof; holding the compressed elastomeric member for a predetermined time period; and, releasing the compressed elastomeric spring member.

The methodology of the present invention furthermore preferably includes the steps of repeating the individual compression cycles for the elastomeric member of the energy absorption apparatus a predetermined number of times. Testing has revealed the compression cycles will vary depending upon the type of elastomer used for the spring. With the elastomeric material having an elastic to plastic strain ratio greater than 1.5 to 1, the predetermined repeat pattern for the elastomeric member can vary between about 5 and about 100 individual compression cycles. The most preferred method of forming the elastomeric spring involves compressing the elastomeric spring in a repeated pattern comprised of about 10 individual compression cycles.

The methodology of the present invention can be furthermore enhanced through use of a press for compressing the elastomeric spring members. Moreover, several elastomeric members are preferably arranged in the press at the same time such that several elastomeric springs are conjointly formed relative to each other at the same time.

According to another form of the invention, the process or method of enhancing spring performance is directed to side bearings for railroad cars. According to this form of the invention, the process or method comprises the steps of: providing a top plate; providing a base arranged in axially spaced relation relative to the top plate; and, inserting an elastomeric spring member formed according to the principals of the present invention between the top plate and the base.

When used in side bearings, the elastomeric spring member preferably has an elongated and generally cylindrical configuration between opposed ends thereof. The elastomeric member forming the spring can further include a centralized opening extending therethrough and opening at opposite ends thereof. Applicant has found that forming the spring member from an elastomeric material having an elastic to plastic strain ratio greater than 1.5 to 1 offers beneficial results over other elastomeric materials.

According to still another form of the invention, there is provided a method for manufacturing a side load bearing which is insertable between a bolster of a wheeled truck and a railroad car body to impede hunting movements of the wheeled truck. In this form of the invention, each side load bearing includes an elastomeric spring accommodated between a base and a top plate. According to this form of the invention, the method comprises the steps of stabilizing the elastomeric spring of the side load bearing such that a substantially constant preload force is placed upon the top plate by the spring thereby simulating a predetermined wear condition for the side load bearing before the side load bearing is installed or inserted between the bolster on the wheeled truck and the railroad car body.

It is, therefore, a primary object of the present invention to present a method of manufacturing an energy absorption apparatus including a specifically formed elastomeric spring housed between the housing members of a railroad car energy absorption apparatus to provide a maximum level of performance for the energy absorption apparatus.

Another object of the present invention is to present a method of manufacturing a railroad car side bearing including an elastomeric spring housed between a base and a top plate and wherein the side bearing is adapted for insertion between a bolster of a wheeled truck and a railroad car body to offer surprising enhanced performance in impeding hunting of the wheeled truck.

According to the present invention, the elastomeric spring is stabilized to maintain a substantially constant spring force capability for the energy absorption apparatus. When the principals of the present invention are applied to a railroad car side bearing, stabilization of the preload force developed by the elastomeric spring simulates a predetermined wear condition for the side bearing. Thus, the side bearing with the stabilized elastomeric spring provides near optimal control of "hunting" responses of the wheeled truck, even during the initial period of use, thus yielding significant advantages to the end user.

Another object of the present invention is to provide a method whereby the performance of a railroad car energy absorption apparatus is significantly enhanced, especially during initial use, without increasing parts, or substantially increasing the cost of the energy absorption apparatus.

Still another object of the present invention is to provide a railroad car side bearing having significantly enhanced performance characteristics, especially during initial use of the side bearing, through relatively simple changes in the process of manufacturing the elastomeric spring forming part of the side bearing.

These and other objects, aims and advantages of the present invention are more fully described in the following detailed description, the appended claims, and drawings.

DETAILED DESCRIPTION OF THE DRAWINGS

DETAILED DESCRIPTION OF THE PRESENT INVENTION

While the methodology of the present invention is illustrated for use with a particular and preferred embodiment of a railroad car energy absorption apparatus, it should be understood the disclosure of the present invention in combination with a railroad car side bearing is to be considered as setting forth an exemplification of the invention which is not intended to limit the invention to the specific railroad car energy absorption apparatus illustrated.

Figure 1:
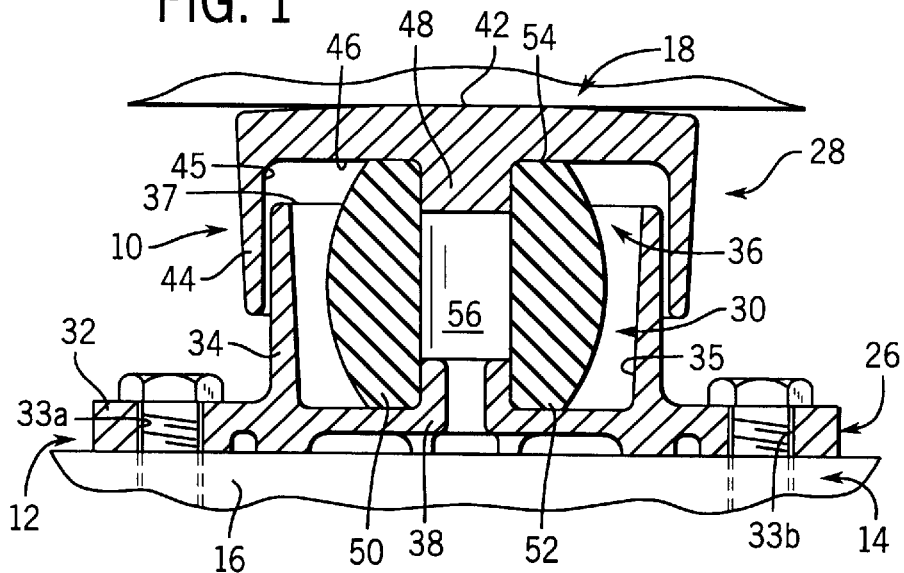
FIG. 1 is a longitudinal sectional view of a railroad car side bearing embodying principals of the present invention and illustrating, in partial detail, other parts of the railroad car and wheeled truck.

Referring now to the drawings, wherein like reference numerals indicate like parts throughout the several views, a railroad car energy absorption apparatus is illustrated in the form of a railroad car side bearing generally identified, in FIG. 1, by reference numeral 10. As is conventional, the railroad car side bearing 10 is mounted on a railroad car 12. More specifically, the side bearing 10 is mounted on and in operative combination with a wheeled truck 14 forming part of a suspension set which allows the railroad car 12 to ride along and over tracks (not shown). As is known, the side bearing 10 is mounted on a transversely positioned, partially illustrated, bolster 16 forming part of the wheeled truck 14 to support a railroad car body 18.

As illustrated in FIG. 1, and as is conventional, the illustrated side bearing 10 includes a base housing or cage 26, a top plate or cap 28 positioned in axially spaced and preferably guided relation relative to the base housing 26, and a spring 30 for applying a preload or force to the top plate or cap 28. As discussed in detail hereinafter, the preload developed by the side bearing 10 is used to create frictional contact between the car body 18 and the top plate 28 thereby impeding hunting movements of the wheeled truck 14 as the railroad car 12 moves over the tracks.

In the side bearing 10 illustrated for exemplary purposes, the preferably metal housing 26 includes a base 32 configured for suitable attachment to the bolster 16 as through any suitable means. In the illustrated embodiment, base 32 includes diametrically opposed holes or opening 33a and 33b allowing suitable fasteners to extend endwise therethrough for fastening the base 32 to the bolster 16. In the illustrated embodiment, housing 26 further includes an integrally formed upwardly extending round wall 34 preferably extending 360 degrees around the housing 26 and defining an open top cavity or internal void 35. A stop 36 is located around a top edge 37 of the housing 26. For purposes described below, an upwardly extending guide or projection 38 is centrally located on the base 32 within the cavity 35 of housing 26.

In the side bearing 10 illustrated for exemplary purposes, the preferably metal top plate or cap 28 includes a top surface 42 for frictionally engaging and establishing metal-to-metal contact with the car body 18. In the illustrated embodiment, the top plate 28 further includes an integrally formed round wall 44 depending from the top surface 42 of top plate 28, preferably for 360 degrees, to define an open bottom cavity or internal void 45. As illustrated in FIG. 1, the round wall 34 of housing 26 is preferably sized to fit within the round wall 44 of top plate 28 to allow the members or elements 26, 28 of the side bearing to move in generally telescopic and guided relation relative to each other. As shown, a bottom surface 46 on the top plate 28 cooperates with the stop 36 on the top edge or surface 37 of the base 26 to limit displacement of the top plate 28 relative to base 26 and thereby limit flexure of spring 30. In the illustrated form, the top plate 28 furthermore includes a depending guide or projection 48 centrally located within the cavity 45 defined by the top plate 28.

Figure 2:
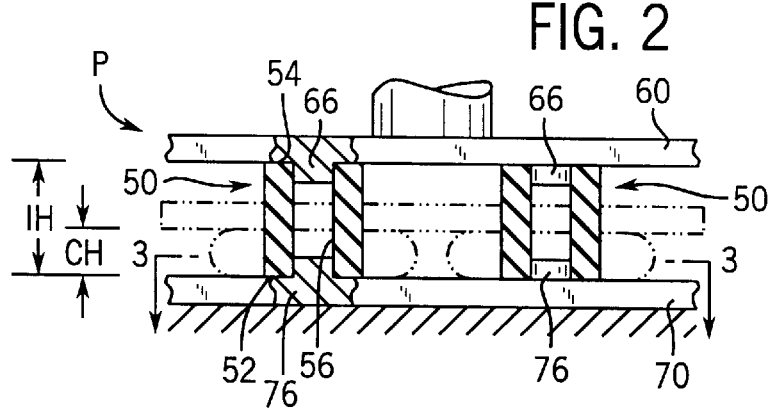
FIG. 2 is a schematic illustration of one type of machine used to manufacture an elastomeric spring for the railroad car side bearing.

In the illustrated form, spring 30 for the side bearing 10 comprises a formed, resiliently deformable thermoplastic elastomer member 50 having a configuration suitable to accommodate its insertion between the base housing 26 and top plate 28. As illustrated in FIG. 2, the elastomeric member 50 has an initial shape including an initial free height IH between opposed ends 52 and 54 thereof. The thermoplastic elastomeric member 50, illustrated for example in FIG. 1, preferably includes a vertically elongated generally cylindrical configuration between the opposed ends 52 and 54. In a most preferred form, the thermoplastic elastomer member 50 has a centrally disposed hole or aperture 56 extending therethrough and opening to the opposite ends 52 and 54 thereof. Furthermore, and without detracting from the spirit and scope of the present invention, member 50 could be formed as a composite elastomeric member similar to that disclosed and claimed in coassigned U.S. Pat. No. 5,868,384 to David G. Anderson herein incorporated by reference to the extent applicable.

The thermoplastic elastomer 50 can be formed from a myriad of elastomeric materials. Preferably, the thermoplastic elastomer member 50 is formed from a copolyesther polymer elastomer manufactured and sold by DuPont under the name HYTREL. Ordinarily, however, a HYTREL elastomer has inherent physical properties that make it unsuitable for use as a spring. Applicant's assignee has discovered, however, that after shaping HYTREL into the configuration of member 50, it is possible to advantageously impart spring like characteristics into the initial member. This is accomplished through a one-time compression of the initially shaped elastomeric member 50 more than 30% of its initial free height IH. U.S. Pat. No. 4,198,037 more fully describes the above noted polymer material and forming process and is herein incorporated by reference to the extent applicable.

Figure 3:
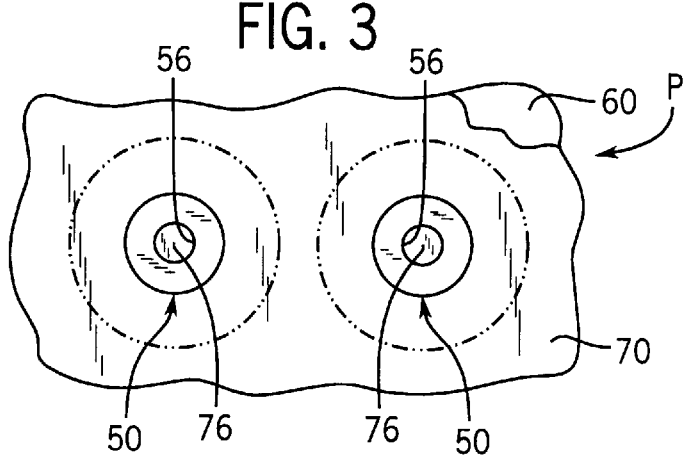
FIG. 3 is a sectional view taken along line 3—3 of FIG. 2.

Preferably, and as schematically represented in FIGS. 2 and 3, the initially shaped spring member 50 has heretofore been compressed one-time in a press P to form the spring 30 for the side bearing 10. In a most preferred form, press P is configured as a hydraulically operated press although it will be appreciated that other machines would equally suffice without detracting or departing from the spirit and scope of the present invention.

As schematically illustrated in FIGS. 2 and 3, upper and lower dies or press plates 60, 70, respectively, on press P, used to compress the elastomeric members 50, are preferably provided with radially spaced buttons or projections 66 and 76, respectively, for locating the elastomeric members 50 in the press P. As will be appreciated, the press plates 60, 70 are sized such that a plurality of elastomeric members 50 can be readily fitted therebetween whereby a plurality of elastomeric springs 30 are simultaneously formed as a result of the methodology of the present invention.

Applicant has surprisingly discovered a method or process for forming the spring 30 of the energy absorption apparatus 10 to further enhance the performance characteristics thereof. According to the present invention, performance characteristics for spring 30 can be beneficially enhanced through a unique method or process of stabilizing the elastomeric member 50. According to the present invention, these beneficial performance characteristics for the spring 30 can be realized by stabilizing the spring 30 prior to insertion of the railroad car energy absorption apparatus, i.e., railroad car side bearing 10, into operable combination on the railroad car 10 (FIG. 1). Stabilization of the elastomeric spring 30 is effected by submitting the elastomeric member 50 to a predetermined repeat pattern comprised of a series of compression cycles.

Figure 4:
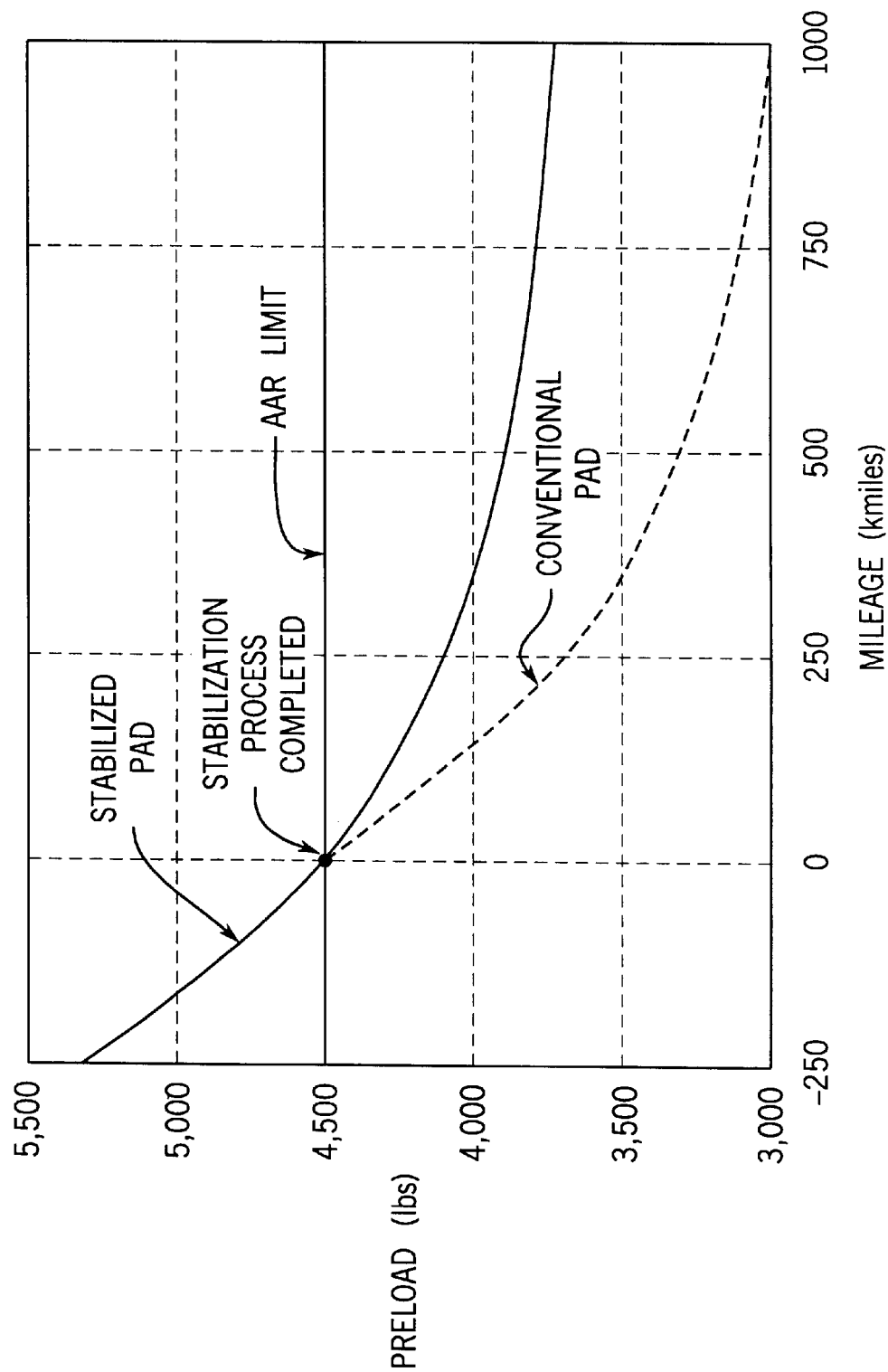
FIG. 4 is a graph schematically illustrating performance of a conventional elastomeric spring with performance of an elastomeric spring manufactured according to the present invention

To maximize the ability of the side bearing 10 to impede hunting, the preload developed by the elastomeric spring 30 must likewise be maximized. AAR Specifications for Design and Fabrication of Freight Cars, however, limits the amount of preload which can be developed by the side bearing 10. According to these AAR rules, a side bearing is permitted to support no more than 85% of the weight of the railroad car body 18. As schematically illustrated in FIG. 4, conventional elastomeric springs or pads experience a significant reduction in preload after a finite period of use. On the other hand, elastomeric springs or pads which are stabilized according to the present invention have a portion of their reduction in preload simulated in a manufacturing process prior to insertion of the elastomeric spring and energy absorption apparatus into actual use on the railroad car. Accordingly, and as schematically illustrated in FIG. 4, the stabilized elastomeric spring maximizes and develops an enhanced initial preload compared to conventional elastomeric springs. When a HYTREL material is used as the elastomeric member 50, and following the predetermined repeat pattern of the present invention, the elastomeric material forming spring 30 will have an elastic to plastic strain ratio greater than 1.5 to 1.

According to one form of the invention, a single or individual compression cycle in the repeat pattern for the elastomeric member 50 involves: (a) compressing the elastomeric member 50 to a predetermined compressed height CH; (b) holding the compressed elastomeric member 50 at that predetermined compressed height CH for a predetermined period of time; and (c) releasing the compressed elastomeric member 50.

In one form of the invention, the step of compressing the elastomeric member to a predetermined compressed height CH during a single compression cycle involves compressing the elastomeric member 50 in a range of about 35% to about 60% of its initial free height IH. In a most preferred form of the invention, the elastomeric member 50 is compressed in a single compression cycle a predetermined height of about 42% of its initial free height. Of course, it is also within the spirit and scope of the present invention, to vary the extent of compression of the elastomeric member 50 during other compression cycles of the repeat pattern to which the elastomeric member 50 is subjected to effect stabilization thereof. That is, during the repeat pattern to which the elastomeric member 50 is effected to accomplish stabilization thereof, the elastomeric member 50 may be compressed during one compression cycle in the range of about 35% of its initial free height while the next or subsequent individual compression cycle in ther repeat pattern for the same elastomeric member 50 can involve compression of the elastomeric member in the range of 37% of its initial free height followed by increasing or decreasing levels of compression in subsequent compression cycles during the stabilization process.

In one form of the invention, the predetermined period of time or dwell period for which the compressed elastomeric member 50 is held at the compressed height CH during the compression portion of the repetitive pattern ranges between about 0.5 minutes to about 10 minutes. In a most preferred form of the invention, the predetermined period of time or dwell period at which the compressed elastomeric member 50 is held at the compressed height CH during an individual compression cycle of the repetitive pattern is about 1 minute. Again, it is within the spirit and scope of the present invention to vary the dwell periods during the individual compressive cycles of the repetitive compression pattern of the elastomeric member 50.

Following the compression portion and expiration of the dwell period of each individual compression cycle, the compressed elastomeric member 50 is released to freely return to a non-compressed height. It is also within the spirit and scope of the present invention, however, to control the release of the compressed elastomeric member 50 following the dwell period as the compressed elastomeric member 50 returns to its non-compressed height.

As mentioned, a salient feature of the present invention involves appreciating the advantageous effects which can be accomplished through stabilization of the elastomeric member 50 as by repeating the above-described individual compression cycles on the elastomeric member 50 a predetermined number of times. That is, according to the present invention, the predetermined repeat pattern for forming the elastomeric member 50 involves consecutively repeating the individual compression cycles on the elastomeric member 50 between about 5 and about 100 times. As will, be appreciated by those skilled in the art, the repetitive number of times the elastomeric member 50 is compressed varies depending upon several factors. That is, the repeat pattern will depend upon the extent of compression of the elastomeric member, the dwell period time length, and the manner in which the compressed elastomeric member is released.

When a HYTREL material is used to form the elastomeric spring 30, a single or individual compression cycle in the predetermined repeat pattern used to effect stabilization of the elastomeric member involves: (a) compressing the elastomeric member 50 beyond the plastic limit thereof; (b) holding the compressed elastomeric member 50 for a predetermined period of time or dwell; and, (c) releasing the compressed elastomeric member 50.

As will be appreciated by those skilled in the art, the steps of forming the elastomeric member 50 into the elastomeric spring 30 will vary in degree depending upon the type of thermoplastic elastomer material used to form the spring 30. Regardless of the material used to form the spring 30, however, one important aspect of the present invention comes from an appreciation and understanding that elastomeric springs normally tend to experience a significant reduction in the preload force applied during use of the energy absorption apparatus after the energy absorption apparatus is used in service for only a limited time. When considering railroad car side bearings, a reduction in the preload developed by the side bearing 10 against the railroad car body 18 limits or restricts the ability of the side bearing 10 to act against the yaw axis rotation or hunting of the wheeled truck 14 as the car 12 moves along the track.

According to one methodology, after the elastomeric spring 30 is formed according to the teachings if the present invention, and as illustrated in FIG. 1, the spring 30 is inserted between the base 26 and the top plate 28. In the illustrated form of the invention, the openings or recesses at opposite ends of the spring 30 fit over and about the guides 38 and 48 on the base 26 and the top plate 28 to position or locate the stabilized spring 30 within the side bearing 10.

With the present invention, the elastomeric spring 30 for the side bearing 10 is stabilized prior to its insertion into the side bearing 10 by repeatedly cycling or working the elastomeric member 50 used to form the spring 30. Working or stabilizing the elastomeric member 50 through a predetermined repeat pattern effects permanent deformation of the elastomeric member 50 while maximizing the preload relative to an acceptable level and simulating a predetermined wear condition for the side bearing 10 after the stabilized spring 30 is inserted between the base 26 and top plate 28.

Although the above described methodology is preferred, it is also within the spirit and scope of the present invention to work or stabilize the elastomeric spring 30 after its insertion between the base 26 and top plate 28 but prior to insertion of the side bearing 10 into operative combination with the bolster 16 on a wheeled truck 14 and the railroad car body 18. According to this process, the elastomeric member 50 is inserted between the base 26 and top plate 28 of the side bearing 10. Thereafter, the entire assembly of parts, including the elastomeric member 50, base 26 and top plate 28 are inserted into the press P and the entire assembly is cycled to condition or stabilize the elastomeric spring 30 according to the above-described steps. After stabilizing the elastomeric spring 30 between the base 26 and the top plate 28, the entire assembly can then be subsequently inserted between the bolster 16 on the wheeled truck 14 and the car body 18 to impede hunting of the wheeled truck during movement of the car body 18 over and across the tracks or rails.

By stabilizing the elastomeric spring to produce a maximum yield and a substantially constant preload at a predetermined level, the elastomeric spring allows a newly installed side bearing to perform at a simulated or predetermined wear condition whereby the side bearing provides near optimal control of "hunting" responses of the wheeled truck, even during the initial period of use, thus yielding significant advantages to the end user. The stabilized elastomeric spring provided through the methodology of the present invention advantageously enhances the performance of the railroad car bearing, especially during use of the side bearing, without increasing parts, or substantially increasing the cost of the railroad car side bearing. Another advantage to be realized through incorporation of the methodology of the present invention involves the ability to provide a railroad car side bearing, having significantly enhanced performance characteristics, especially during initial use of the side bearing, through relatively simple changes in the process of manufacturing the elastomeric spring forming part of the side bearing.

From the foregoing, it will be observed that numerous modifications and variations can be effected without departing from the true spirit and scope of the novel concept of the present invention. It will be appreciated that the present disclosure is intended to set forth one example of the invention. The one example set forth, however, is not intended to limit the invention to that particular process involved with formation or manufacturing of a railroad car side bearing using an elastomeric spring. The disclosure is intended to cover by way of the appended claims all such modifications as fall within the scope of the claims.

What is claimed is:

1. A method of manufacturing an elastomeric spring for a railroad car, said method comprising the steps of:
providing an elastomeric member having an initial shape including an initial height between opposed ends thereof; and
compressing said elastomeric member in a predetermined cycle and in a predetermined repetitive pattern to permanently deform the initial shape thereof and simulate a predetermined wear for said elastomeric spring while permitting said elastomeric spring to provide a substantially constant predetermined preload force after said elastomeric spring is arranged in operable combination with said railroad car.

2. The method according to claim 1 wherein said elastomeric member has a vertically elongated and generally cylindrical configuration between opposed ends thereof.

3. The method according to claim 1 wherein the predetermined compression cycle for said elastomeric member involves: (a) compressing the elastomeric member to a predetermined height; (b) holding said compressed elastomeric member at said predetermined height for a predetermined time period; and, (c) releasing said compressed elastomeric member.

4. The method according to claim 3 wherein said predetermined repetitive pattern includes repetitively performing said predetermined compression cycle on said elastomeric member about 5 to about 100 times.

5. The method according to claim 1 wherein the predetermined compression cycle for said elastomeric member involves: (a) compressing the elastomeric member to a predetermined percentage of said initial height; (b) holding said compressed elastomeric member for a predetermined time period; and, (c) releasing said compressed elastomeric member.

6. The method according to claim 5 wherein said predetermined repetitive pattern includes performing said predetermined compression cycle on said elastomeric member about 5 to about 100 times.

7. The method according to claim 1 wherein said elastomeric member is comprised of an elastomeric material having an elastic to plastic strain ratio greater than 1.5 to 1.

8. The method according to claim 1 further including the step of arranging said elastomeric member in a press adjacent another elastomeric member such that a plurality of elastomeric springs are manufactured simultaneously relative to each other.

9. A method of manufacturing an elastomeric spring for a railroad car, said method comprising the steps of:
providing an elastomeric member having an initial shape including an initial height between opposed ends thereof, said elastomeric member being formed from an elastomeric material having an elastic strain to plastic strain ratio greater than 1.5 to 1; and
compressing said elastomeric member in a predetermined repetitive pattern beyond a plastic limit thereof to permanently deform the initial shape thereof and transmute said elastomeric member into said elastomeric spring, with said predetermined repetitive pattern effectively simulating predetermined wear of said elastomeric spring while permitting said elastomeric spring to provide a substantially constant predetermined preload force after said elastomeric spring in arranged is operable combination with said railroad car.

10. The method according to claim 9 wherein said elastomeric member has a vertically elongated and generally cylindrical configuration between opposed ends thereof.

11. The method according to claim 9 wherein said predetermined repetitive pattern of compression for said elastomeric member involves: (a) repeatedly compressing the elastomeric member to a predetermined height; (b) repeatedly holding said compressed elastomeric member at said predetermined height for a predetermined time period; and, (c) repeatedly releasing said compressed elastomeric member.

12. The method according to claim 9 further including the step of arranging said elastomeric member in a press adjacent another elastomeric member such that a plurality of elastomeric springs are manufactured simultaneously relative to each other.

13. A method for manufacturing an elastomeric spring for a railroad car energy absorption apparatus including first and second members arranged in axially spaced relation relative to each other, said method comprising the steps of:

providing an elastomeric member having an initial shape including an initial height between opposed first and second generally parallel ends thereof, said elastomeric member being formed from an elastomeric material having an elastic strain to plastic strain ratio greater than 1.5 to 1; and compressing said elastomeric member in a predetermined cycle and in a predetermined repetitive pattern to permanently deform the initial shape thereof and transmute said elastomeric member into said elastomeric spring with said predetermined repetitive pattern applied to said elastomeric member simulating predetermined wear of said elastomeric spring while permitting said elastomeric spring member to maximize and maintain a substantially constant elastomeric spring preload force to be applied between said members after said elastomeric spring is arranged in operable combination therewith.

14. The method according to claim 13 wherein the predetermined compression cycle for said elastomeric spring member involves: (a) compressing the elastomeric spring member to a predetermined height; (b) holding said compressed elastomeric spring member at said predetermined height for a predetermined time period; and, (c) releasing said compressed elastomeric spring member.

* * * * *